United States Patent
Hsiao et al.

(10) Patent No.: US 8,837,937 B2
(45) Date of Patent: Sep. 16, 2014

(54) DETECTING DEVICE FOR DETECTING INSERTION LOSS AND RETURN LOSS OF INDIVIDUAL EVENTS IN AN OPTICAL FIBER NETWORK

(71) Applicant: Polarlink Technologies, Ltd., Kaohsiung (TW)

(72) Inventors: Ching-Wen Hsiao, Kaohsiung (TW); Hsuan-Hung Wu, Kaohsiung (TW); Shih-Tien Lin, Kaohsiung (TW); Fu-Chun Hung, Kaohsiung (TW); Yu-Shu Chen, Kaohsiung (TW); Ching-Lin Wu, Kaohsiung (TW); Chun-Hung Su, Kaohsiung (TW)

(73) Assignee: Polarlink Technologies, Ltd., Kaohsiung (TW)

( * ) Notice: Subject to any disclaimer, the term of this patent is extended or adjusted under 35 U.S.C. 154(b) by 83 days.

(21) Appl. No.: 13/736,128

(22) Filed: Jan. 8, 2013

(65) Prior Publication Data
US 2013/0322874 A1    Dec. 5, 2013

(30) Foreign Application Priority Data
May 29, 2012   (TW) .............................. 101210188 U

(51) Int. Cl.
H04B 10/071    (2013.01)
H04B 10/40     (2013.01)
H04B 10/073    (2013.01)

(52) U.S. Cl.
CPC ............ *H04B 10/073* (2013.01); *H04B 10/071* (2013.01)
USPC ............................................ 398/28; 398/135

(58) Field of Classification Search
CPC .. H04B 10/40; H04B 10/2503; H04B 10/071; H04B 10/073
USPC ................................................... 398/135–139
See application file for complete search history.

(56) References Cited

U.S. PATENT DOCUMENTS

| | | | |
|---|---|---|---|
| 8,655,166 B2* | 2/2014 | Soto et al. | 398/13 |
| 8,724,102 B2* | 5/2014 | Urban | 356/73.1 |

* cited by examiner

*Primary Examiner* — Leslie Pascal
(74) *Attorney, Agent, or Firm* — Alan Kamrath; Kamrath IP Lawfirm, P.A

(57) ABSTRACT

A detecting device that detects insertion loss of fiber route and return loss of individual events in an optical fiber network based on signals from dual paths to obtain various kinds of reference information of the optical fiber network. When the first path is selected, a detection signal produced using frequency modulated continuous wave (FMCW) technique is output to the optical fiber network. A return signal of the detection signal is used to analyze the position and return loss of various events in the optical fiber network. When the second path is selected, a common detection light is output to the optical fiber network. Based on the return signal of the common detection light, the insertion loss and total return loss of the entire network are obtained.

2 Claims, 7 Drawing Sheets

DETECTING DEVICE FOR DETECTING INSERTION LOSS AND RETURN LOSS OF INDIVIDUAL EVENTS IN AN OPTICAL FIBER NETWORK

BACKGROUND OF THE INVENTION

1. Field of the Invention

The invention relates to an optical fiber testing device that not only tests insertion loss and total return loss of fiber route, but also measures position and return of events.

2. Description of Related Art

A current way of detecting events on an optical fiber path is achieved using the so-called frequency modulated continuous wave (FMCW) technique. With reference to FIG. 4, the detection device using the FMCW principle mainly includes a laser emitter 80, a frequency modulated continuous signal generator 81, a directional coupler 82, a photo detector 83, a mixer 84, an amplifier 85, an analog/digital converter (ADC) 86, and a signal processing unit 87.

The laser emitter 80 can emit detecting light. The frequency modulated continuous signal generator 81 can generate a continuous cyclic FM signal. After the frequency modulated continuous signal and the detecting light are combined and then pass through the directional coupler 82, the signals are transmitted to an optical fiber network 100. When the frequency modulated continuous signal travels in the optical fiber network 100 and encounters a discontinuity interface, the frequency modulated continuous signal will be reflected in the optical fiber path.

The photo detector 83 receives the reflected frequency modulated continuous signal and converts it into an electrical signal. The mixer 84 mixes the original frequency modulated continuous signal (A) generated by the frequency-modulated continuous signal generator 81 and the frequency modulated continuous signal (B) reflected from the optical fiber network 100. The mixed waveform is shown in FIG. 5. A beat frequency is produced between the original frequency modulated continuous signal (A) and the reflected frequency modulated continuous signal (B).

The amplifier 85 amplifies the mixed frequency modulated continuous signals. The ADC 86 converts the amplified signals into digital signals, and transmits them to the signal processing unit 87. The signal processing unit 87 performs fast Fourier transform (FFT) on the digital signals to obtain a reflection frequency. The reflection frequency is then used to calculate the position of the reflection point, thereby obtaining all events existing on the optical fiber network 100. Taking the structure shown in FIG. 6 as an example, different events at different positions P to S are connected by an optical fiber network. Using the above-mentioned FMCW detection method, one obtains the trace shown in FIG. 7. The trace shows different event positions P, Q, R, S.

Although the trace of the event positions can be applied to effectively detect the exact position and return loss of each event on the optical fiber network 100. However, it does not tell the total return loss and insertion loss of the optical fiber network 100.

SUMMARY OF THE INVENTION

In view of the fact that conventional detecting device can only detect the position and return loss of each event, the invention provides a detecting device capable of detecting the position and return loss of each event as well as the insertion loss and total return loss of the entire optical fiber network.

To achieve the above-mentioned objective, the invention includes:

a frequency modulated continuous signal generator for determining whether to generate a continuous cyclic frequency modulated (FM) signal according to a control signal;

a laser emitter connected with the frequency modulated continuous signal generator for outputting common detecting light, or combining the common detecting light with the FM signal to produce FM detecting light;

a directional coupler having
  a first connection port connected to the laser emitter to receive either the common detecting light or the FM detecting light; and
  a second connection port transmitting either the common detecting light or the FM detecting light to an optical fiber network, and receiving a return signal of the common detecting light or the FM detecting light;

a photo detector connecting to a third connection port of the directional coupler for converting the return signal of the common detecting light or the FM detecting light into electrical signal and selectively connecting to a first path or a second path;

a mixer on the first path and connecting with the photo detector for receiving the FM signal output by the frequency modulated continuous signal generator and the return signal of the FM detecting light output by the photo detector, and performing frequency mixing to generate a beat frequency signal;

a first amplifier on the first path and connected with the mixer for amplifying the beat frequency signal;

a second amplifier on the second path and connected with the photo detector for receiving the electrical signal converted from the return signal of the common detecting light and amplifying the electrical signal;

an analog/digital converter (ADC) selectively connecting to the first amplifier or the second amplifier for converting the analog signal amplified by the first amplifier or the second amplifier into a digital signal; and a signal processing analysis unit connected with the ADC for receiving the digital signal; wherein the digital signal received from the first path is analyzed to obtain a position and return loss of any event on the optical fiber network; and the digital signal received from the second path is analyzed to obtain the insertion loss and total return loss of the optical fiber network.

Therefore, by simply switching between the first path and the second path, the invention outputs different types of detecting light to the optical fiber network. A single device thus achieves the observation of various kinds of information without the need to purchase other devices. This greatly saves user's cost and increases the values of the device.

DETAILED DESCRIPTION OF THE PREFERRED EMBODIMENT

Figure 1:
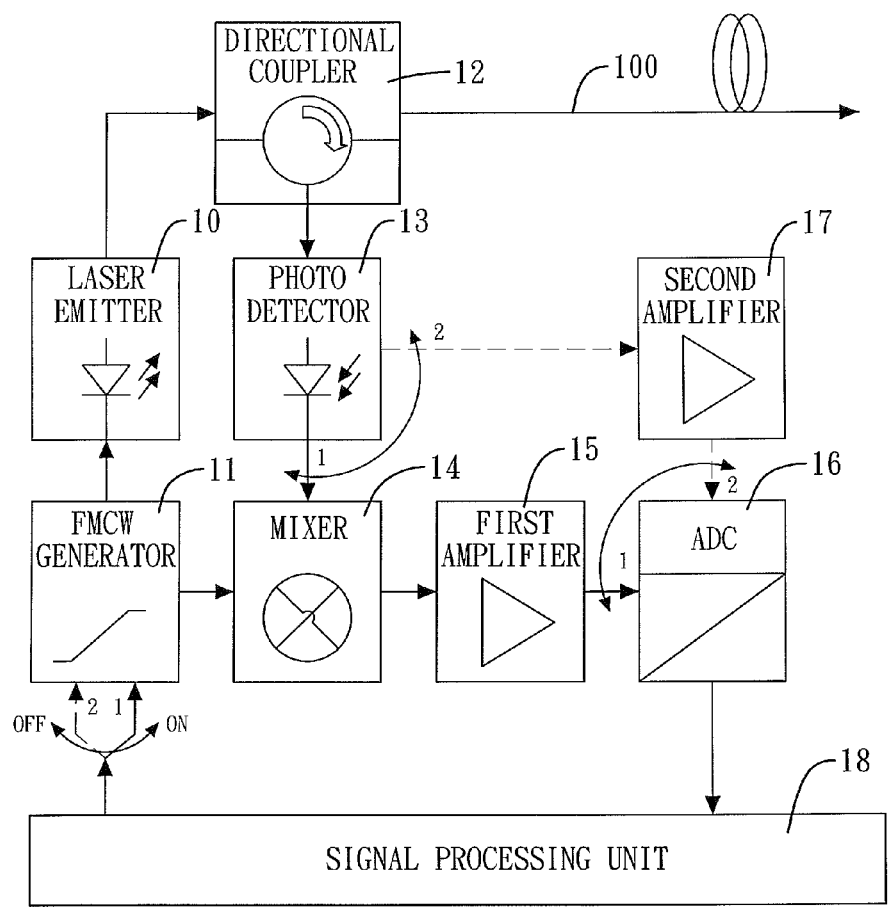
FIG. 1 is a block diagram of a detecting device of the present invention.

As shown in FIG. 1, the invention includes a laser emitter 10, a frequency modulated continuous signal generator 11, a directional coupler 12, a photo detector 13, a mixer 14, a first amplifier 15, an analog/digital converter (ADC) 16, a second amplifier 17, and a signal processing unit 18.

The frequency modulated continuous signal generator 11 receives a control signal output from the signal processing unit 18 to control whether to generate a continuous cyclic FM signal.

The laser emitter 10 generates common detecting light. When the frequency modulated continuous signal generator 11 outputs the FM signal, the detecting light and the FM signal can be modulated by a modulating device into FM signal detecting light. On the other hand, if the frequency modulated continuous signal generator 11 does not output any FM signal, the laser transmitter 10 outputs only the common detecting light.

The directional coupler 12 has a first port connecting to the laser emitter 11 and lies on the transmission path of the detecting light. A second port of the directional coupler 12 connects to an optical fiber network 100. The above-mentioned FM signal detecting light or the common detecting light is transmitted via the directional coupler 12 outward to the optical fiber network 100. If any discontinuity exists in the optical fiber network 100, the FM signal detecting light generates return feedback energy. Using the directional coupler 12, the return energy is fed back to the photo detector 13 along the optical fiber network 100. The return energy is provided in subsequent signal processing procedures to determine the position and return loss of each individual event. If, on the other hand, the photo detector 13 receives the return energy from the common detecting light, the return energy can be analyzed to find out the insertion loss and the total return loss of the entire optical fiber network 100.

The photo detector 13 is connected to a third port of the directional coupler 12 for receiving the return energy from the directional coupler 12 and converting such energy to an electrical signal. The photo detector 13 is a device switchable between the first path and the second path. The first path goes through the mixer 14, the first amplifier 15 and the ADC 16. The second path goes through the second amplifier 17 and the ADC 16.

The mixer 14 is electrically connected to the frequency modulated continuous signal generator 11 and the photo detector 13. The mixer 14 mixes the reflected FM signal and the original FM signal to generate a beat frequency signal.

The first amplifier 15 is connected to the output of the mixer 14 for receiving the beat frequency signal and enhancing its intensity.

The ADC 16 can switch to connect to the first amplifier 15 or the second amplifier 17 to convert the amplified signal into a digital signal and output it to the signal processing unit 18.

If the photo detector 13 receives the signal reflected from the common detecting light on the optical fiber network 100, it is output to the second amplifier 17 for signal amplification. The signal is then transmitted to the signal processing unit 18 by the second amplifier 17.

The signal processing unit 18 receives digital signal output from the ADC 16 and analyzes the digital signal to determine the position and return loss of each event, insertion loss, and total return loss on the optical fiber network 100.

Figure 2:
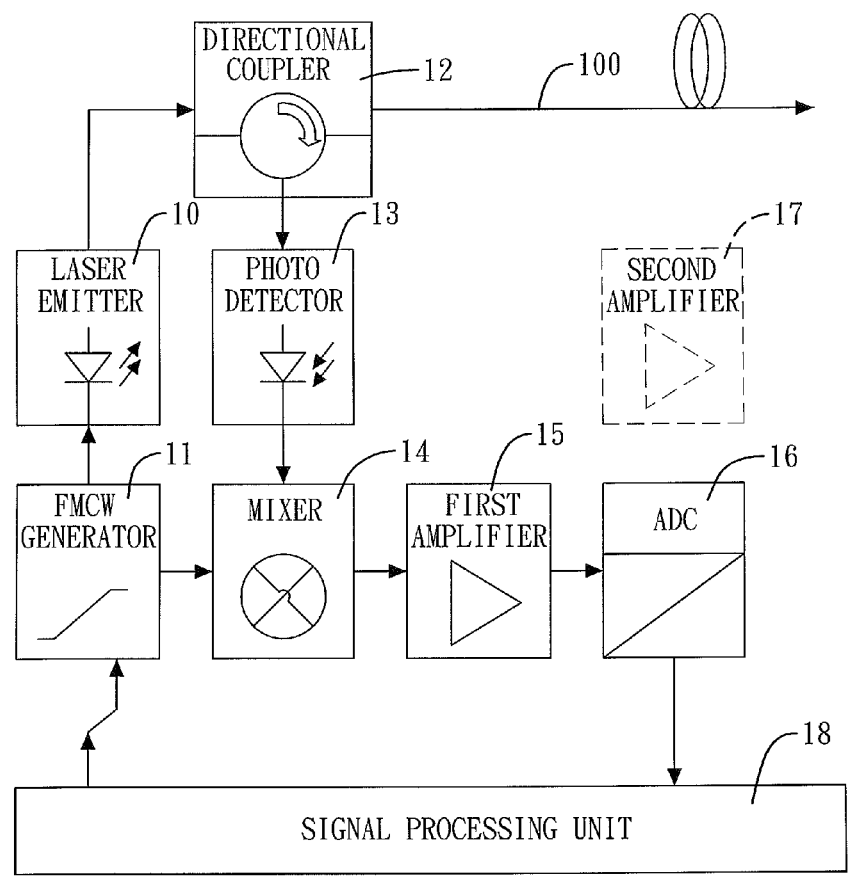
FIG. 2 is a schematic view of signal transmission via the first path enabled of the present invention.

In practical applications, different optical signals are guided into the optical fiber network 100. Reflected signals from the first path or the second path are received for further analysis. With reference to FIG. 2, when the first path is enabled, the frequency modulated continuous signal generator 11 outputs the FM signal. The detecting light emitted by the laser emitter 10 and the FM signal are combined into FM detecting light. Via the directional coupler 12, the FM detecting light is input to the optical fiber network 100. The reflected signal passes through the photo detector 13, the mixer 14, the first amplifier 15 and the ADC 16, and reaches the signal processing unit 18, thereby determining the position and return loss of each event on the optical fiber network 100.

Figure 3:
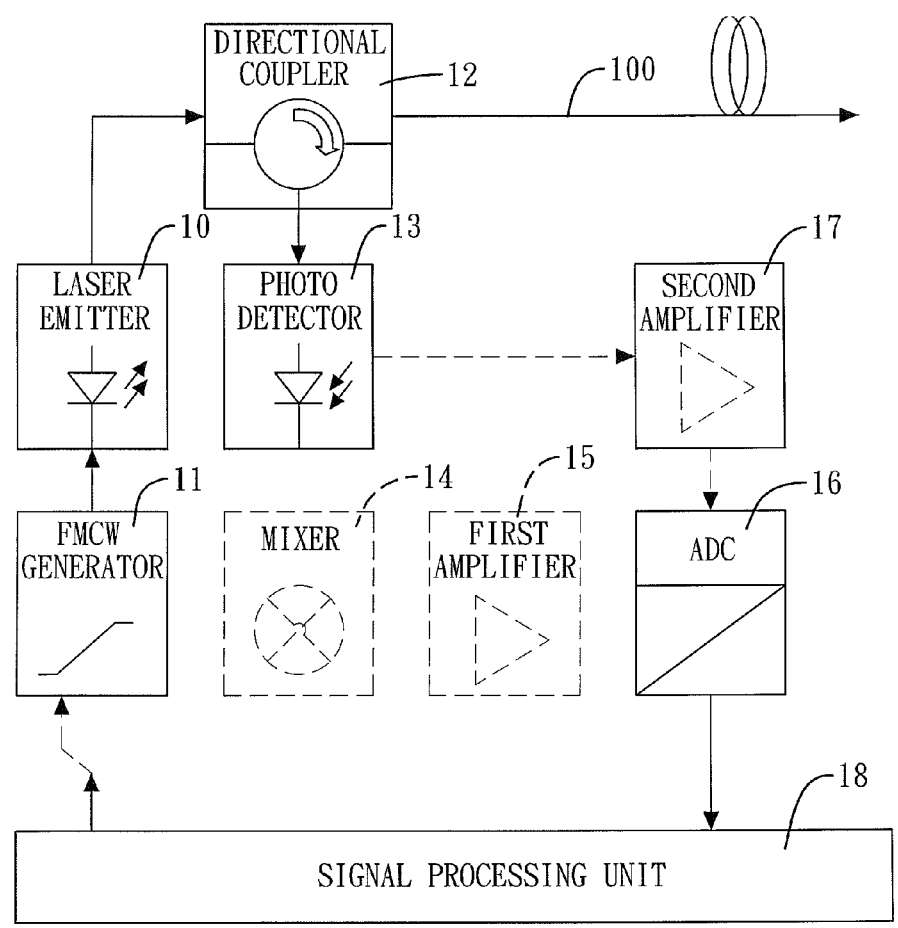
FIG. 3 is a schematic view of signal transmission via the second path enabled of the present invention.
Figure 4:
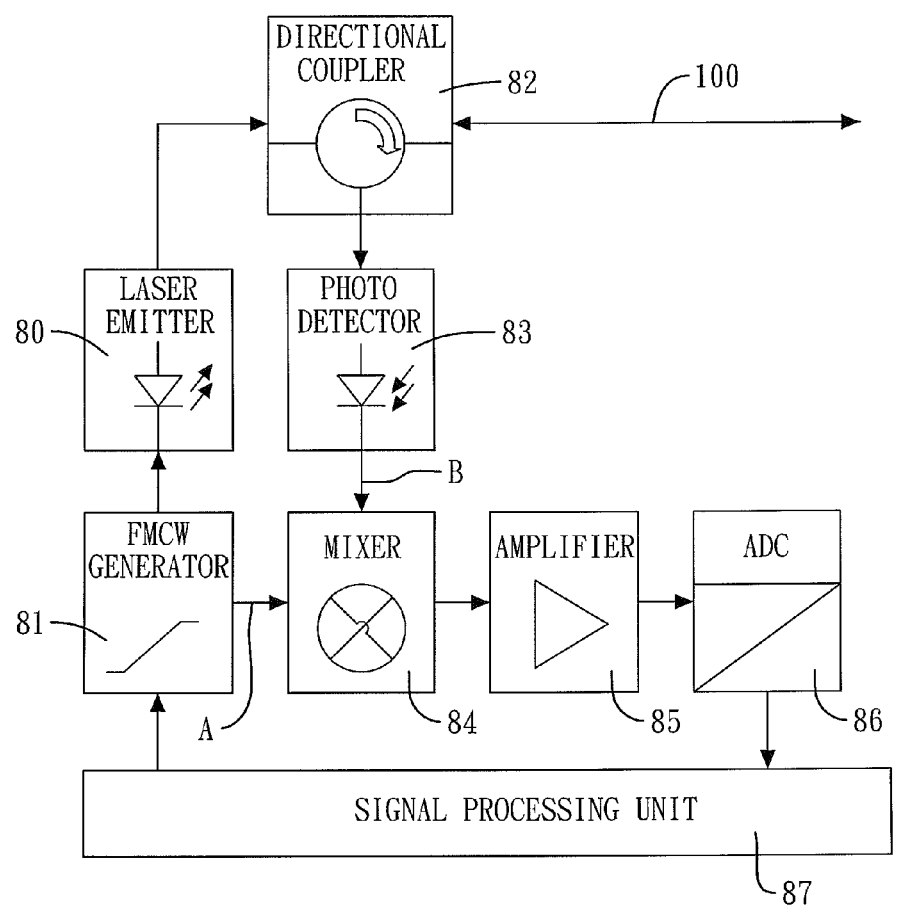
FIG. 4 is a network block diagram of a conventional detecting device making use of the FMCW principle.
Figure 5:
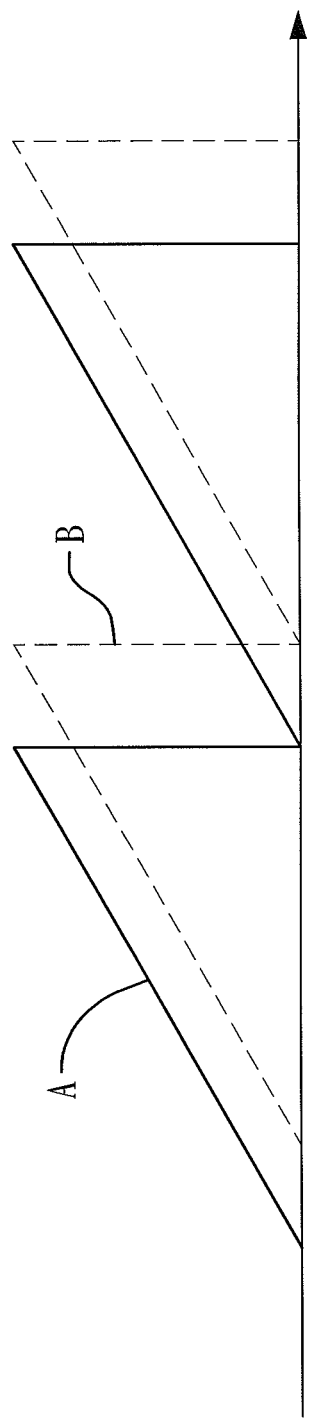
FIG. 5 is a schematic view of the FMCW trace.
Figure 6:
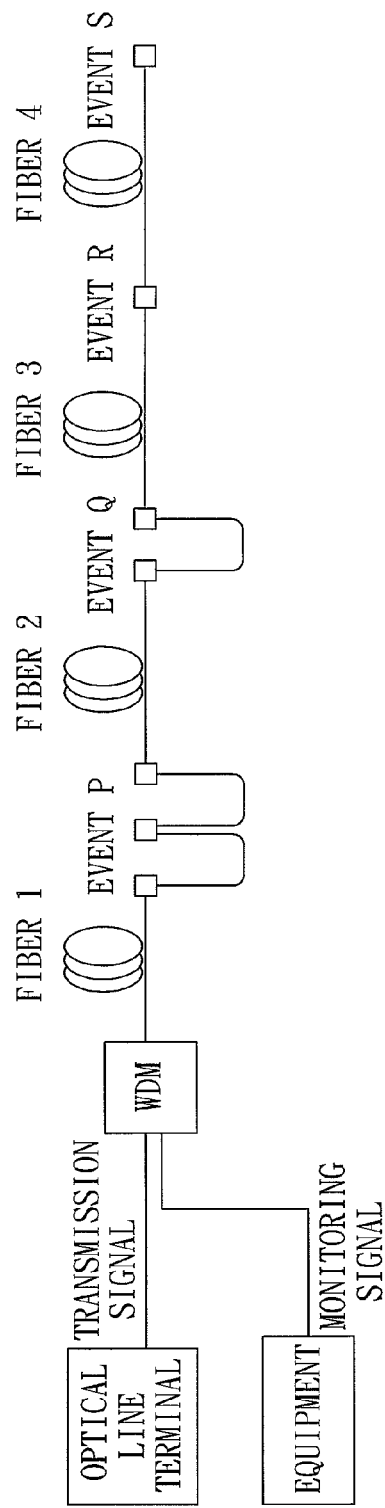
FIG. 6 shows an optical fiber network connecting with different stations.
Figure 7:
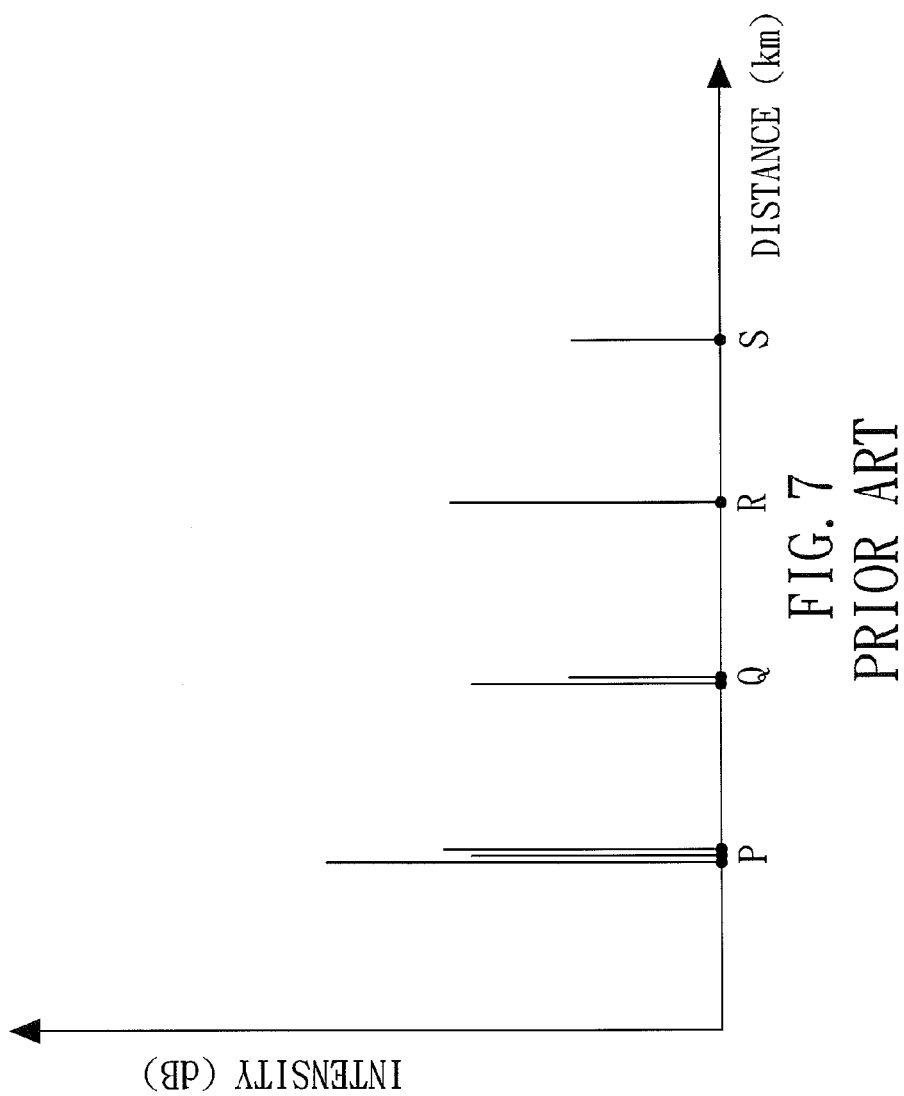
FIG. 7 shows the positions and signal return magnitudes of optical fiber events.

With reference to FIG. 3, when the second path is enabled, the frequency modulated continuous signal generator 11 does not output the FM signal. Only the laser emitter 10 emits the common detecting light. Via the directional coupler 12, the common detecting light is input to the optical fiber network 100. The reflected signal goes through the photo detector 13, the second amplifier 17 and ADC 16, and finally reaches the signal processing unit 18, thereby determining the insertion loss and total return loss of the entire optical fiber network 100.

In summary, the invention makes appropriate adjustments to existing detection devices using the principle of frequency modulation continuous wave (FMCW) technique to detect the position and return loss of each event, insertion loss and the total return loss.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A detecting device for detecting insertion loss of fiber route and return loss of individual events in an optical fiber network, comprising:
    a frequency modulated continuous signal generator for determining whether to generate a continuous cyclic frequency modulated (FM) signal according to a control signal;
    a laser emitter connected with the frequency modulated continuous signal generator for outputting common detecting light, or combining the common detecting light with the FM signal to produce FM detecting light;
    a directional coupler having
        a first connection port connected to the laser emitter to receive either the common detecting light or the FM detecting light; and
        a second connection port transmitting either the common detecting light or the FM detecting light to an optical fiber network, and receiving a return signal of the common detecting light or the FM detecting light;
    a photo detector connecting to a third connection port of the directional coupler for converting the return signal of the common detecting light or the FM detecting light into electrical signal and selectively connecting to a first path or a second path;
    a mixer on the first path and connecting with the photo detector for receiving the FM signal output by the frequency modulated continuous signal generator and the return signal of the FM detecting light output by the photo detector, and performing frequency mixing to generate a beat frequency signal;

a first amplifier on the first path and connected with the mixer for amplifying the beat frequency signal;

a second amplifier on the second path and connected with the photo detector for receiving the electrical signal converted from the return signal of the common detecting light and amplifying the electrical signal;

an analog/digital converter (ADC) selectively connecting to the first amplifier or the second amplifier for converting the analog signal amplified by the first amplifier or the second amplifier into a digital signal; and a signal processing analysis unit connected with the ADC for receiving the digital signal;

wherein the digital signal received from the first path is analyzed to obtain a position and return loss of any event on the optical fiber network; and the digital signal received from the second path is analyzed to obtain the insertion loss and total return loss of the optical fiber network.

2. The detecting device as claimed in claim 1, wherein the signal processing unit outputs the control signal to control the frequency modulated continuous signal generator;

when the first path is selected, the frequency modulated continuous signal generator outputs the FM signal; and when the second path is selected, the frequency modulated continuous signal generator does not output the FM signal.

* * * * *